W. H. Furman,
Pisciculture,

No. 78,952. Patented June 16, 1868.

Witnesses:

Inventor:
W. H. Furman

United States Patent Office.

WILLIAM H. FURMAN, OF MASPETH, NEW YORK.

Letters Patent No. 78,952, dated June 16, 1868.

---

IMPROVEMENT IN PISCICULTURE.

---

*The Schedule referred to in these Letters Patent and making part of the same.*

---

TO ALL WHOM IT MAY CONCERN:

Be it known that I, WILLIAM H. FURMAN, of Maspeth, in the county of Queens, and State of New York, have invented a new and useful Improvement is Pisciculture, of which the following is a full, clear, and exact description, reference being had to the accompanying drawing, forming part of this specification, and in which—

Figure 1:
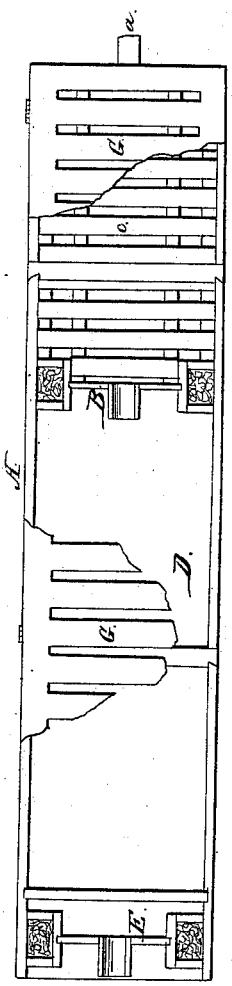
Figure 2:
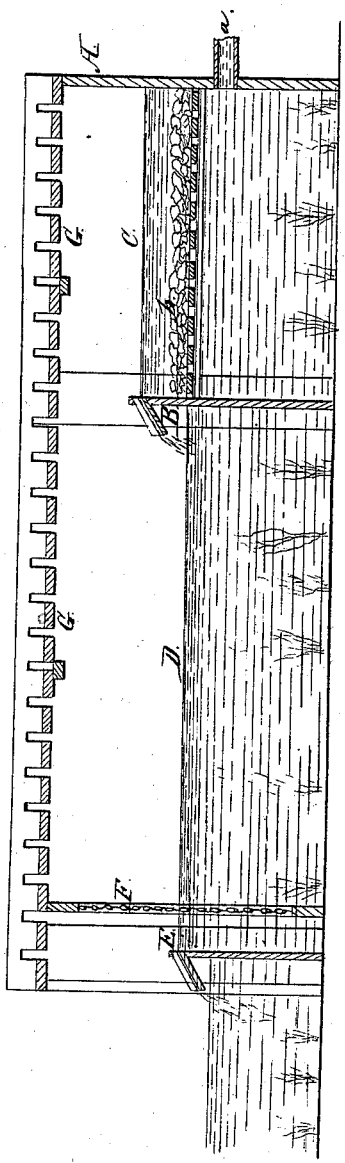

Figure 1 represents a plan of a structure designed for the breeding of fish, in illustration of my improved method or system, with the cover to the same broken away, to exhibit the interior, and Figure 2 a longitudinal sectional elevation of said structure.

Similar letters of reference indicate corresponding parts.

In the natural breeding of fish, such as the salmon or trout, the destruction of the ova and very young, by fish of larger growth belonging to the same and different species, also by muskrats and many other natural enemies, so largely reduces the prolific character of such fish that but a small percentage of the spawn cast hatch, or, if hatching, reach maturity.

There are, likewise, other causes which interfere with the propagation of the fish, and certain provisions necessary in breeding, which may be briefly remarked upon here, by way of more clearly explaining the principles upon which my invention is based.

Thus the salmon and trout, when breeding, invariably seek, for their spawning-ground, where the same is attainable, a portion of a stream in which the bottom is of a sandy and gravelly nature, and is fed by numerous small springs distributed over said bottom, and the water from which percolates through the sand and gravel, and carries off sediment or other matter likely to be injurious to the egg after it has been deposited. Provided the desired seclusion can be secured from observation and other annoyances, the spawning-ground selected by the fish is usually at the extreme head of the brook or stream, as here the water is purer than lower down, and of a higher temperature, and, the current being weaker, the young fish are not so liable to be carried down the stream among their enemies, nor yet so liable to be destroyed by extreme frosts. But, under the most favorable of natural circumstances and resorts, only a very small proportion of the ova ejected hatch, or the young come to maturity, as few or no natural stream-bottoms are to be found which admit of the eggs instantly falling so low among the gravel but that a young fish, intent upon stealing the food of a mature pair, will consume a large proportion of them. Nor are there any natural streams or beds entirely free from sediment, which, through over currents, produce injurious surface-deposits. And again, most or all streams are swollen by freshets, which carry with them destruction to the young. Likewise, on these spawning-grounds, thousands of eggs are buried and destroyed by additional deposits made later in the season.

To overcome these and other difficulties or interferences with the propagation of such fish is the object of my invention, which involves a system of artificial breeding that closely approximates nature, but affords all desired protection to the ova and young, and is generally more favorable to hatching; and in this respect my system is in no way analogous to a method of artificial breeding heretofore practised, in which the eggs are ejected from the female by hand-pressure, and afterwards impregnated by the milk of the male similarly ejected, which process is unnatural, and the fish produced by it stunted or inferior.

In carrying out my improved system, I construct what may be termed a brook-shanty, the same comprising an artificially-constructed spawning-receptacle and receiver for the young fish, with a proper run of water through the latter from a head or spring or springs, the water from which is made to percolate through a properly-gravelled bottom to the spawning-chamber, that, together with the receiver, should be provided with a cover or covers, made to open or close at pleasure, and the receiver be constructed to admit of the old fish from down the stream up through it to the spawning-receptacle; and, furthermore, be provided with a removable screen, or other analogous means, for retaining the young fish till sufficiently grown to descend the stream with safety.

Referring to the accompanying drawing, A represents a trough or troughs divided by a flood-gate, B, to form a spawning-chamber or receptacle, C, and receiver, D.

This trough may be set in a brook or stream, preferably at its extreme upper end or head, or be otherwise suitably disposed to establish the run of water through it from a spring or springs, the flow from which may, if desired, be conducted, by a channel or pipe, $a$, from a distance, to form an artificial stream, leading through the structure to a pond, it being immaterial how the water is supplied, that is, whether by a natural or artificial run, so long as it is furnished by a spring or springs, and made to enter the spawning-chamber C, by percolating through a gravelly bottom, $b$, to said chamber.

This bottom may be formed by constructing it of slats, and laying thereon, first, a thin layer of fine, and afterwards a deeper layer of coarse gravel; and it is desirable that the ground immediately beneath it should possess numerous small springs. The water thus supplied the chamber C establishes a run over the flood-gate B into the receiver D, and from thence over an advance flood-gate, E, to the pond or lake.

This receiver may be of any suitable size and shape, and preferably made with irregular turns or bends throughout its length, for the purpose of establishing a variable speed of the water through it, which is favorable to the health and development of the fish; or a number of receivers may be so joined, to make up a continuity.

The general speed of the stream through the structure may be regulated as required, by the flood-gates or otherwise.

F is removable screen or guard, of sufficient height to prevent egress of the young fish from the receiver before the time it is safe to allow them to go down stream.

G G are slotted lids or covers to the spawning and receiving-chambers C and D. These lids or covers may be of any suitable description.

When it is required to let the fish up for breeding, the screen or guard F is removed, so that the fish, guided by instinct, go up the stream, and through the receiver D into the spawning-chamber C, where the ova are deposited, and at once sink among the gravel, so as to be protected from injury. Here the eggs are hatched, and the mature fish, having been returned to the pond or allowed to go down stream, and the screen or guard F put in its place, the young fish pass from the spawning-chamber to the receiver D, where they are permitted to remain till sufficiently large to go down the stream with safety from destruction by their natural enemies, after which the guard F is raised and they are allowed to descend.

During spawning, and while the young fish are in the receiver, the lids G G may be opened or closed as occasion requires; and if of an open-work character, which admits of air and insertion of the food without opening them, may be loosely covered with matting or other material, where closeness and warmth are required, as, for instance, after the fish have done spawning and during severe weather. These lids also protect the water from injurious foreign matter, likewise the fish, while spawning, from observation or annoyance, and, by the partial darkness induced, serve to keep out snails, and various insects or enemies which destroy the ova.

By this, my improved system of propagating fish, it will be seen that no rule of nature, in any respect, is violated, but much greater protection afforded, both as regards the ova and very young fish, than is attainable under the most favorable of natural circumstances.

The most perfect spawning-bed or gravelly bottom may here be formed, giving a safe resting-place for the eggs the instant they leave the fish, and the current being upwards and away, sediment, which is objectionable, cannot accumulate on or about the spawning-ground, as the chamber C may here be termed.

In fine, all of the causes which produce injury or destruction, both to the ova and very young fish, under the natural method of breeding, as hereinbefore referred to, are by this, my improved system of protection, obviated, or so greatly reduced as materially to advance the propagation of such fish as trout or salmon.

What is here claimed, and desired to be secured by Letters Patent, is—

1. The method, substantially as herein described, of breeding fish, by means of a structure composed of a spawning-chamber or receptacle and receiver for the young fish, with the water introduced thereto, in an upwardly direction, through the gravelly bed or bottom, to the spawning-chamber of the structure, and caused to flow or pass through the receiver, essentially as herein set forth.

2. The brook-shanty or structure A, composed of a spawning-chamber, C, and receiver, D, with flood-gates B E and guard F, or their equivalents, and having the water introduced through the gravelly bed or bottom to the spawning-chamber, to establish a stream or current through the structure, substantially as specified.

WM. H. FURMAN.

Witnesses:
  A. LE CLERC,
  E. P. TRACY.